United States Patent
Beck et al.

(10) Patent No.: US 11,842,297 B2
(45) Date of Patent: *Dec. 12, 2023

(54) SYSTEMS AND METHODS FOR TEMPORARY TRANSACTION PROCESSING

(71) Applicant: Capital One Services, LLC, McLean, VA (US)

(72) Inventors: Daniel Beck, Arlington, VA (US); Lawrence Douglas, McLean, VA (US); Jeffrey Samitt, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,831

(22) Filed: Apr. 25, 2022

(65) Prior Publication Data

US 2022/0253859 A1 Aug. 11, 2022

Related U.S. Application Data

(60) Continuation of application No. 16/185,325, filed on Nov. 9, 2018, now Pat. No. 11,348,111, which is a
(Continued)

(51) Int. Cl.
*G06Q 20/40* (2012.01)
*G06Q 20/32* (2012.01)
(Continued)

(52) U.S. Cl.
CPC ..... *G06Q 20/4016* (2013.01); *G06Q 20/3278* (2013.01); *G06Q 20/405* (2013.01);
(Continued)

(58) Field of Classification Search
CPC .......... G06Q 20/4016; G06Q 20/3278; G06Q 20/405; G06Q 20/409; G06Q 30/00; G06Q 40/02
See application file for complete search history.

(56) References Cited

U.S. PATENT DOCUMENTS

| | | | | |
|---|---|---|---|---|
| 2014/0365961 A1* | 12/2014 | Lefor | | G06F 3/0482 |
| | | | | 715/810 |
| 2015/0220921 A1* | 8/2015 | Dent | | G06Q 20/34 |
| | | | | 705/44 |

FOREIGN PATENT DOCUMENTS

| | | | | |
|---|---|---|---|---|
| WO | WO-2005067372 A2 * | 7/2005 | ............. | G06Q 20/04 |
| WO | WO-2007027791 A2 * | 3/2007 | ........... | G06Q 20/354 |

OTHER PUBLICATIONS

Monterey Credit Union (MCU): Check card Compromise Frequently Asked Questions, 2002, pp. 1-3 (Year: 2002).*

(Continued)

*Primary Examiner* — Bijendra K Shrestha
(74) *Attorney, Agent, or Firm* — Perkins Coie LLP

(57) ABSTRACT

In one embodiment, a system comprises a database configured to store at least one record, at least one network communication device, a storage device comprising instructions, and at least one processor configured to execute the instructions to perform a method. The method may comprise receiving a fraud communication associated with a first primary account number, calculating one or more limitations associated with the first primary account number based on an account associated with the first primary account number, and storing a database record including the first primary account number, a new primary account number, and the limitation(s). The method may further comprise receiving a transaction request including a second primary account number, and comparing the second primary account number to the at least one record. The method may also comprise, based on the comparing, enabling the transaction request to proceed, declining the transaction, or disabling the first primary account number.

20 Claims, 8 Drawing Sheets

Related U.S. Application Data division of application No. 16/101,931, filed on Aug. 13, 2018, now Pat. No. 10,445,737, which is a continuation of application No. 15/926,827, filed on Mar. 20, 2018, now Pat. No. 10,089,629, which is a continuation of application No. 15/141,441, filed on Apr. 28, 2016, now Pat. No. 10,152,714.

(60) Provisional application No. 62/154,456, filed on Apr. 29, 2015.

(51) Int. Cl.
*G06Q 40/02* (2023.01)
*G06Q 30/00* (2023.01)

(52) U.S. Cl.
CPC ........... *G06Q 20/409* (2013.01); *G06Q 30/00* (2013.01); *G06Q 40/02* (2013.01)

(56) References Cited

OTHER PUBLICATIONS

The Federal Reserve Board: What You Need to Know: New Credit Card Rules, Jan. 2010, pp. 1-2 (Year: 2010).*

Braun et al.: Understanding Risk Management in Emerging Retail Payments, Sep. 2008, FRBNY Economic Policy Review, pp. 137-159 (Year: 2008).*

* cited by examiner

SYSTEMS AND METHODS FOR TEMPORARY TRANSACTION PROCESSING

RELATED APPLICATIONS

This application is a continuation of U.S. patent application Ser. No. 16/185,325, filed on Nov. 9, 2018, which is a divisional of U.S. patent application Ser. No. 16/101,931, filed on Aug. 13, 2018, which is a continuation of U.S. patent application Ser. No. 15/926,827, filed on Mar. 20, 2018, which is a continuation of U.S. patent application Ser. No. 15/141,441, filed on Apr. 28, 2016, which claims the benefit of priority of U.S. Provisional Patent Application No. 62/154,456, filed on Apr. 29, 2015, which applications are incorporated by reference in the present application.

BACKGROUND

Payment systems that use payment cards, such as credit cards, debit cards, charge cards, or the like, employ a "PAN" (Primary Account Number) to refer to an associated account. For example, in the case of debit cards, the PAN may be a reference to a checking account at a financial service provider, such as a bank. Payment cards, and their associated PANs, enable convenient access to funds or a line of credit.

But with convenience comes the possibility of fraud. Large retailers are under the constant threat of attack from nefarious actors that attempt to steal PANs and other information in order to use them without the permission of the cardholder. When such mass attacks happen, however, financial institutions are able to respond by preventing stolen PANs from being used, issuing new PANs to each affected cardholder, and sending the new PAN in the form of another payment card. This consequently causes inconvenience for cardholders because the cardholders must wait for the new card to arrive before using the account associated with the new PAN. And more than causing inconvenience for the customer, it causes a loss in revenue for the financial institution.

Moreover, systems and methods are needed to prevent fraudulent use of PANs using mobile devices.

SUMMARY

Disclosed embodiments include methods, systems, and computer-readable media configured to, for example, provide for embodiments related to processing fraud communications and enabling temporary use of PANs that are associated with a fraud communication.

In one aspect, the disclosed embodiments include a system. The system comprises, in some embodiments, a database configured to store at least one record, at least one network communication device, a storage device comprising instructions, and at least one processor configured to execute the instructions to perform a method. The method may comprise receiving a fraud communication associated with a first primary account number, calculating one or more limitations associated with the first primary account number based on an account associated with the first primary account number, and storing, in the database, a record including the first primary account number, a new primary account number, and the one or more limitations. The method may further comprise receiving a transaction request including a second primary account number, and comparing the second primary account number to the at least one record. The method may also comprise, based on the comparing, performing at least one of enabling the transaction request to proceed, declining the transaction, or disabling the first primary account number. Computer-readable media enabling this method are also provided for.

The disclosed embodiments also include a mobile device for performing transactions. The mobile device may include a network communication device, a wireless communication system for performing one or more transactions, at least one storage device, each storage device comprising at least one of instructions or a first primary account number, and at least one processor configured to execute the instructions to perform a method. The method may comprise, in some embodiments, receiving input to initiate a transaction with a merchant device using the wireless communication system and initiating a transaction request using the wireless communication system and the first primary account number. The method may further comprise receiving input related to the first primary account number, receiving, using the network communication device, a communication comprising instructions configured to cause the mobile device to replace the first primary account number with a second primary account number, and in response to receiving the communication, replacing the first primary account number with the second primary account number. The method may further comprise receiving input to initiate a second transaction using the wireless communication system and initiating a transaction using the wireless communication system and the second primary account number.

Aspects of the disclosed embodiments may include tangible computer-readable media that stores software instructions that, when executed by one or more processors, are configured to and capable of performing and executing one or more of the methods, operations, or the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
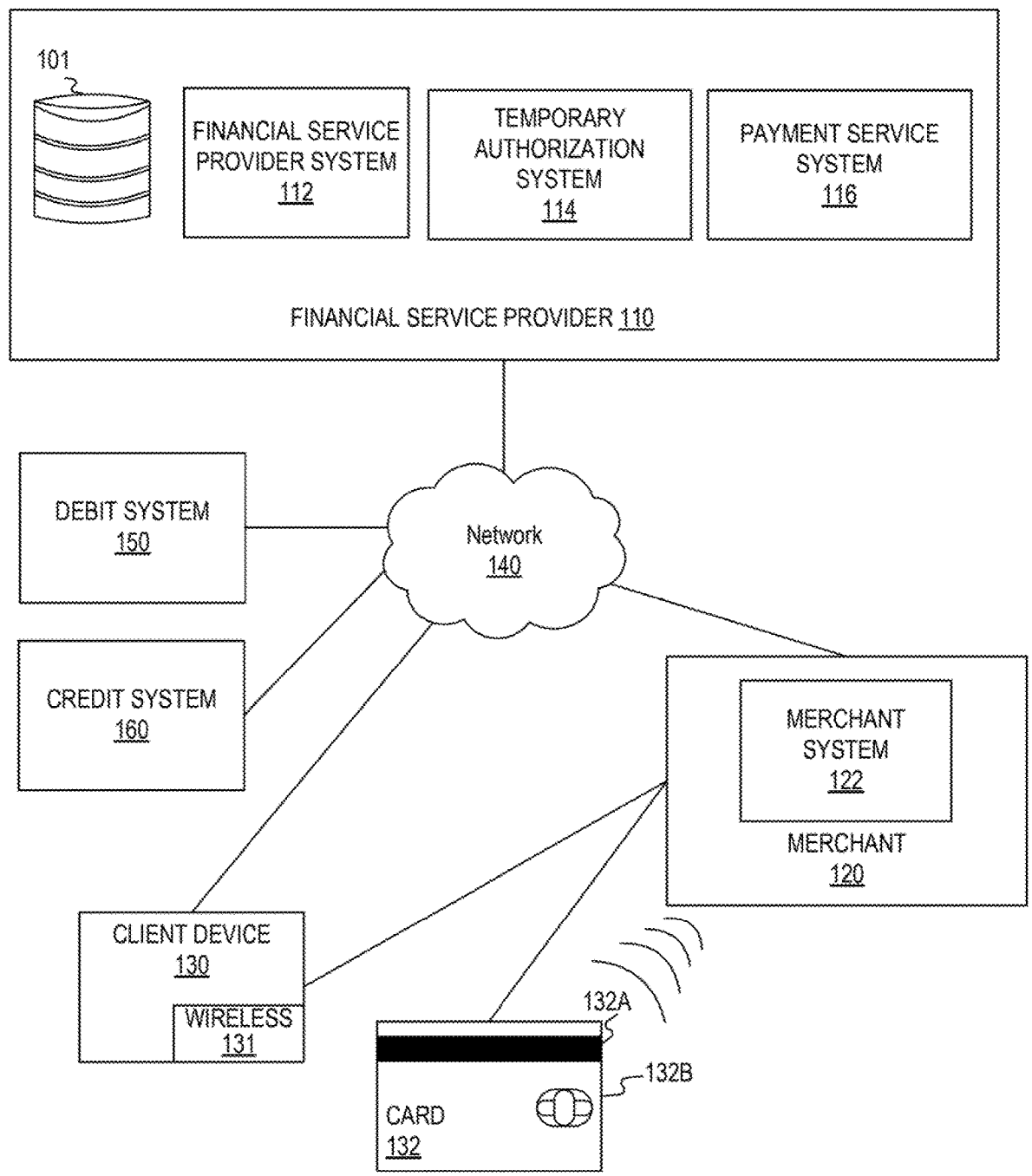
FIG. 1 is a block diagram of an exemplary system, consistent with disclosed embodiments.

FIG. 1 is a block diagram of an exemplary system 100 for performing one or more operations, consistent with the disclosed embodiments. In one embodiment, system 100 may include one or more financial service providers 110, one or more merchants 120, one or more client devices 130, one or more cards 132, network 140, one or more debit systems 150, and one or more credit systems 160. The components and arrangement of the components included in system 100 may vary. Thus, system 100 may include other components that perform or assist in the performance of one or more processes consistent with the disclosed embodiments.

Components of system 100 may be computing systems configured to provide systems for enabling systems for transaction processing, including temporary transaction processing, consistent with disclosed embodiments. As further described herein, components of system 100 may include one or more computing devices (e.g., computer(s), server(s), etc.), memory storing data and/or software instructions (e.g., database(s), memory device(s), etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with financial service provider 110, merchant 120, client device 130, card 132, debit system 150, and/or credit system 160. In certain aspects, users may operate one or more components of system 100 to initiate and provide input for one or more operations consistent with the disclosed embodiments.

Components in system 100 may communicate with one another using messages in known formats. For example, ISO (International Organization for Standardization standard) 8583 defines a message format and communications flow to enable different systems to exchange transaction requests and responses to transaction requests. ISO 8583 may include one or more fields that store data usable by devices illustrated in FIG. 1 to communicate information such as transaction requests, responses to transaction requests, inquiries, indications of fraud, security information, or the like. For example, an ISO 8583 message may include a PAN in the second data field (also known as DE2), an amount of a transaction in DE4, a date of settlement in DE15, the location of merchant 120 or merchant system 122 in DE41, DE42, and/or DE43, or the like. Certain card networks (e.g., debit system 150 and credit system 160) may require that other information be stored in reserved "private" fields of such a message. For example, DE61, DE62, and DE63 are reserved for "private" use in that they provide a space for card networks to insert or require data that they deem necessary or helpful in completing a transaction. For example, some card networks use DE62 or DE63 to indicate whether a payment is intended to initiate a recurring payment. When FSP 110 receives a message that indicates a recurring payment, FSP 110 may determine that future repeated transactions that match or substantially match a first transaction (e.g., varying in transaction amount by less than 25%, occurring within three days of the same day each month) are unlikely to be fraudulent.

Financial service provider (FSP) 110 may be an entity that provides, maintains, manages, or otherwise offers financial services. For example, financial service provider 110 may be a bank, credit card issuer, or any other type of financial service entity that generates, provides, manages, and/or maintains financial service accounts for one or more cardholders. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, or the like. FSP 110 may be implemented as one or more computers or other devices.

FSP 110 may include one or more databases 101. Database 101 may comprise records that contain multiple PANs (Primary Account Numbers). In one aspect, each record may contain a first PAN that is associated with a fraud communication. For example, the first PAN may have been reported as stolen during a burglary or fraud event at a retailer, or may represent a card that a cardholder has misplaced. The first PAN may become associated with one or more limitations and a time period. The limitations include, for example, limits on how often PANs can be used to make purchases, limits on the dollar value of each purchase, limits on the location of purchases, limits on a merchant, or the types of merchants or transactions (e.g., online vs. in-store), limits on the number of purchases per time period, limits on the dollar value of purchases during a time period, limits to enable only a single transaction with an approximate amount, or the like. The time period includes, for example, a day or time after which the first PAN cannot be used to effect a purchase. Each record may also contain a second PAN. The second PAN may be a PAN intended to replace the first PAN, may have been mailed or otherwise communicated to a cardholder, and may be used without the one or more limitations.

FSP 110 may include one or more financial service provider systems 112. In one aspect, FSP system 112 may be one or more computing devices configured to perform one or more operations consistent with disclosed embodiments. In one aspect, financial service provider system 112 may be a desktop computer, a server, or any other type of computing device. Financial service provider system 112 may include one or more processors configured to execute software instructions stored in memory. The one or more processors may be configured to execute software instructions that when executed by a processor performs known Internet-related communication and financial service-based processes.

Financial service provider system 112 may execute software that provides data used for generating and displaying interfaces, including content on a display device included in, or connected to, client device 130. In some embodiments, FSP 110 may provide one or more web sites or online portals that are accessible by client device 130, debit system 150, credit system 160, and/or merchant 120 over network 140. The disclosed embodiments are not limited to any particular configuration of financial service provider system 112.

FSP 110 may also include one or more temporary authorization systems 114. In one aspect, temporary authorization system 114 may be one or more computing devices configured to perform one or more operations consistent with disclosed embodiments. In one aspect, temporary authorization system 114 may be a desktop computer, a server, or any other type of computing device. Temporary authorization system 114 may include one or more processors configured to execute software instructions stored in memory. The one or more processors may be configured to execute software instructions that when executed by a processor preforms fraud-related processes. For example, temporary authorization system 114 may execute software that receives a fraud communication (such as a communication indicating that a card number has been stolen or a cardholder desires a new PAN), may initiate the issuance of a new PAN, may determine one or more limitations on a current PAN that is associated with a fraud communication, may store limitations on a current PAN in a database such as database 101, may forward a transaction to payment service system 116 for processing, acceptance, or declination, or the like.

FSP 110 may also include one or more payment service systems 116. In one aspect, payment service system 116 may be one or more computing devices configured to perform one or more operations consistent with disclosed embodiments. For example, payment service system 116 may be a desktop computer, a server, or any other type of computing device. Payment service system 116 may include one or more processors configured to execute software instructions stored in memory. The one or more processors may be configured to execute software instructions that when executed by the one or more processors perform known Internet-related communication, database management, financial service-based processes, and/or funds transfer functions. For instance, payment service system 116 may execute software that performs funds transfer operations between accounts associated with account associated with the received usernames or user identifiers.

Payment service system 116 may also approve or decline transaction requests. In some embodiments, transaction requests may come in the form of known message formats, such as a message that complies with ISO 8583. For example, merchant system 122 may generate an ISO 8583 message indicating that a cardholder having an account at FSP 110 would like to make a credit transaction of $500.00. If the FSP 110 and/or payment service system 116 determine that the cardholder's account contains at least $500.00 in available credit, FSP 110 may generate and send a second ISO 8583 message approving the transaction.

The disclosed embodiments are not limited to any particular configuration of payment service system 116. Payment service system 116, moreover, need not be part of financial service provider 110 in all embodiments, and could be implemented as a separate system or operated by a separate entity.

Merchant 120 may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities) may purchase, consume, use, etc. Merchant 120 may offer for sale one or more products of product manufacturer 120. In one example, merchant 120 may be associated with a merchant brick and mortar location that a cardholder (e.g., a user of client device 130) may physically visit and purchase a product or service. Merchant 120 may also include back- and/or front-end computing components that store data and execute software instructions to perform operations consistent with disclosed embodiments, such as computers that are operated by employees of the merchant (e.g., back office systems, etc.).

Merchant 120 may include merchant system 122. Merchant system 122 may include one or more computing systems, such as server(s), desktop computer(s), point-of-sale device(s), etc., that are configured to execute stored software instructions to perform operations associated with a merchant, including one or more processes associated with processing purchase transactions, generating transaction data, generating product data (e.g., SKU data) relating to purchase transactions, etc. Merchant system 122 may perform one or more operations consistent with the disclosed embodiments. The disclosed embodiments are not limited to any particular configuration of merchant system 122. As one example, merchant system 122 may be a point-of-sale system like a cash register. Merchant system 122 may comprise functionality and/or hardware operable to receive wireless communications from client device 130. For example, merchant system 122 may be configured to utilize technologies such as near field communication (NFC), RFID, infrared, electric field, magnetic fields, Wi-Fi (i.e., IEEE 802.11), Bluetooth, or other technologies, in order to initiate and/or process a purchase or other transaction.

Merchant system 122 may also generate and send transaction requests to systems such as FSP 110 or payment service system 116. Such transaction requests may comply with ISO 8583. For example, merchant system 122 may generate an ISO 8583 message indicating that a cardholder having an account at FSP 110 would like to make a credit transaction of $500.00. If the FSP 110 and/or payment service system 116 determine that the cardholder's account contains at least $500.00 in available credit, FSP 110 may generate and send a second ISO 8583 message approving the transaction. If merchant system 122 receives an indication (e.g., in the form of an ISO 8583 message) that the transaction is approved, the merchant may complete the transaction (e.g., by providing the cardholder with goods/services).

Client device 130 may be one or more computing devices configured to perform one or more operations consistent with disclosed embodiments. Client device 130 may be a desktop computer, a laptop, a server, a mobile device (e.g., tablet, smart phone, etc.), or any other type of computing device. For exemplary purposes, aspects of the disclosed embodiments are described with reference to client device 130 as a mobile client device, such as a smart phone, tablet, or the like. As mentioned herein, however, the disclosed embodiments are not limited to such examples. For example, client device 130 could be a laptop, a desktop, or any other device.

Client device 130 may include one or more processors configured to execute software instructions stored in memory, such as memory included in client device 130. Client device 130 may include software that when executed by a processor performs known Internet-related communication, content display processes, and financial service-related processes for a user of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with components over network 140, and generates and displays content in interfaces via a display device included in client device 130. The disclosed embodiments are not limited to any particular configuration of client device 130. For instance, client device 130 may be a mobile device that stores and executes mobile applications that provide financial service-related functions offered by financial service provider system 112 and/or merchant system 122, such as a mobile banking application associated with a private label financial service account for checking balances, paying bills, person-to-person payments, merchant payments, financial transactions, receiving marketing messages, etc. In certain embodiments, client device 130 may be configured to execute software instructions relating to location services, such as GPS locations. For example, client device 130 may be configured to determine a geographic location of client device 130 (and associated user) and provide location data and time stamp data corresponding to the location data. Client device 130 may also store and execute applications that enable a cardholder to receive a request to confirm whether the cardholder wishes to proceed with a transaction.

In some embodiments, client device 130 may include wireless system 131. Wireless system 131 may be implemented as a system for communicating with devices in the vicinity of client device 130 to effect a purchase or other transaction. For example, wireless system 131 may be implemented as a system for communicating transaction-related information, such as a PAN, an expiration date, or the like using near field communication (NFC), RFID, infrared, electric field, magnetic fields, Wi-Fi (i.e., IEEE 802.11), Bluetooth, etc.

Card 132 may comprise a physical card having a magnetic stripe and/or circuitry for transmitting information to merchant system 122. For example, card 132 may have magnetic stripe 132A. Magnetic stripe 132A may comprise a multi-track magnetic stripe. Each track of magnetic stripe 132A may contain one or more pieces of information, including a PAN associated with card 132, an expiration date, a security code such as a CVV (Card Verification Value) encoded in one of the tracks of magnetic stripe 132A, a name of a cardholder associated with card 132, or other information. The magnetic stripe may be used to transmit this information to merchant system 122 using, for example, a magnetic stripe reader.

Card 132 may additionally or alternatively have a chip 132B. Chip 132B may be a conduit by which information stored on circuitry (not shown) in card 132 is transmitted to merchant device 122 or a device attached to merchant device 122, such as a smartcard reader (not shown). Chip 132B may transmit one or more of a PAN, an expiration date, security codes such as a Dynamic CVV, a name of a cardholder of card 132, or other information, to a device that comes in contact with chip 132B.

In other embodiments, the information stored on circuitry (not shown) in card 132 is transmitted to merchant device 122 or a device attached to merchant device 122, using contactless or wireless protocols (e.g., Radio Frequency Identification-based systems)

In other embodiments, card 132 may be a virtual card in that the PAN, expiration date, security codes, or other information exists as a set of data rather than being printed or encoded on a physical card. In these embodiments, card 132 may not have a magnetic stripe 132A or a chip 132B, as the cardholder would instead enter a PAN associated with the card at a terminal (such as merchant device 122) or a device (such as client device 130), would verbally inform a clerk of the number (e.g., over the phone), would show the number to a clerk (e.g., a clerk at merchant device 122), or the like.

In one embodiment, merchant 120 may interface with financial service provider 110, client device 130, or card 132 (via, e.g., merchant system 122) to perform one or more operations consistent with the disclosed embodiments. In one aspect, merchant 120 may operate or otherwise communicate with FSP 110 via a website, API resource, or the like.

Network 140 may be any type of network configured to provide communications between components of system 100. For example, network 140 may be any type of network (including infrastructure) that provides communications, exchanges information, and/or facilitates the exchange of information, such as the Internet, a Local Area Network, wireless network (e.g., a Wi-Fi/802.11 network), NFC, magnetic fields, Optical code scanner, infrared, or other suitable connection(s) that enables the sending and receiving of information between the components of system 100. In other embodiments, one or more components of system 100 may communicate directly through a dedicated communication link(s), such as links between financial service provider 110, merchant 120, and client device 130.

Debit system 150 may be, for example, one or more devices that enable merchants (e.g., merchant 120), financial service providers (e.g., FSP 110), cards (e.g., card 132), and devices (e.g. client device 130) to communicate with one another to effect balance transfers or inquiries (e.g., in the form of purchases). For example, debit system 150 may be implemented as an interbank network (e.g., STAR, CIRRUS, etc.) that connects an FSP associated with merchant 120 and an FSP associated with card 132, such that merchant 120 can initiate a debit request through a first FSP to withdraw money from an account maintained by a second FSP associated with card 132.

Credit System 160 may be, for example, one or more devices that enable merchants (e.g., merchant 120), financial service providers (e.g., FSP 110), cards (e.g., card 132), and devices (e.g. client device 130) to communicate with one another to effect balance transfers or inquiries (e.g., in the form of purchases). For example, credit system 160 may be implemented as a card network (e.g., VISA, MASTERCARD, etc.) that connects an FSP associated with merchant 120 and an FSP associated with card 132, such that merchant 120 can initiate a credit request through a first FSP to initiate an authorization request to receive funds from a second FSP associated with card 132.

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 112, temporary authorization system 114, payment service system 116, and merchant system 122 may constitute a part of components of system 100 other than those specifically described, or may constitute a part of multiple components of system 100 (i.e., a distributed system). Moreover, temporary authorization system 114 and/or payment service system 116 may be separate and distinct from financial service provider 110 and be operated by, for example, one or more third parties having access to customer specific information. Additionally, information described above as being stored at systems in FSP 110 or merchant 120 may alternatively or additionally be stored at systems associated with debit system 150 and/or credit system 160.

Figure 2:
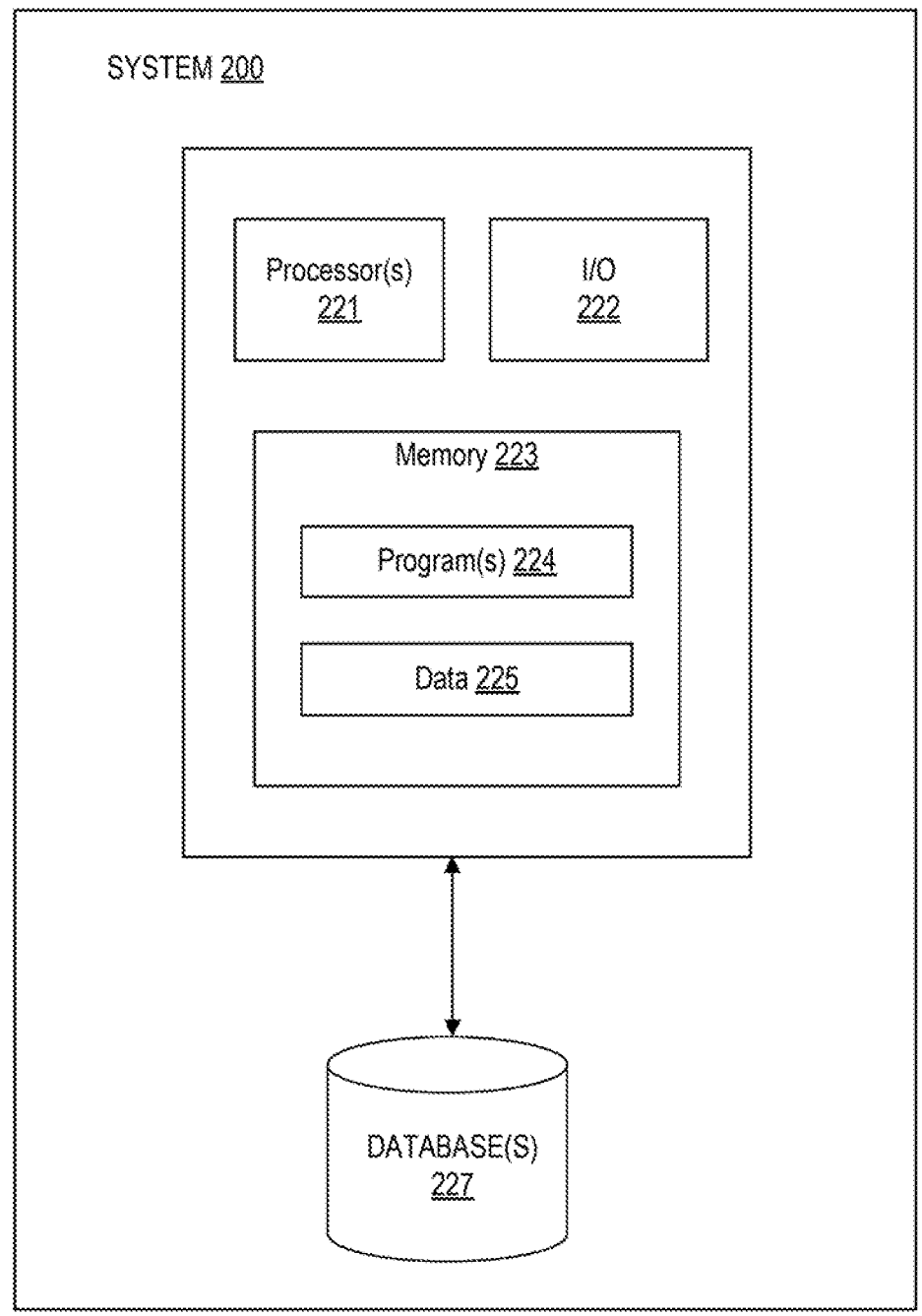
FIG. 2 is a diagram of another exemplary system, consistent with disclosed embodiments.

FIG. 2 is a diagram of another exemplary system 200, consistent with disclosed embodiments. Variations of exemplary system 200 may be used by financial service provider 110, merchant 120, client device 130, debit system 150, or credit system 160. In one embodiment, system 200 may comprise one or more processors 221, one or more input/output (I/O) devices 222, and one or more memories 223. In some embodiments, system 200 may take the form of a server, general purpose computer, mainframe computer, or any combination of these components. In some embodiments, system 200 may take the form of a mobile computing device such as a smartphone, tablet, laptop computer, or any combination of these components. Alternatively, system 200 may be configured as a particular apparatus, embedded system, dedicated circuit, or the like based on the storage, execution, and/or implementation of the software instructions that perform one or more operations consistent with the disclosed embodiments.

Processor 221 may include one or more known processing devices, such as mobile device microprocessors or any various other processors. The disclosed embodiments are not limited to any type of processor(s) configured in system 200.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the client device 130, or program 224 may comprise multiple programs. Memory 223 may also store data 225 that is used by one or more programs. In certain embodiments, memory 223 may store software that may be executed by processor(s) 221 to perform one or more processes consistent with disclosed embodiments.

I/O devices 222 may be one or more devices configured to allow data to be received and/or transmitted by system 200. I/O devices 222 may include one or more digital and/or analog devices that allow system 200 to communicate with other machines and devices, such as other components of system 100. For example, I/O devices 222 may include a screen for displaying communications displaying communications requesting that a user confirm a pending transaction, requesting a user to report fraudulent behavior, requesting a user to confirm making a payment, or the like. I/O devices 222 may also include one or more digital and/or analog devices that allow a user to interact with system 200 such as a touch-sensitive area, keyboard, buttons, or microphones. I/O devices 222 may also include other components known in the art for interacting with a user.

The components of system 200 may be implemented in hardware, software, or a combination of both hardware and software, as will be apparent to those skilled in the art. For example, although one or more components of system 200 may be implemented as computer processing instructions, all or a portion of the functionality of system 200 may be implemented instead in dedicated electronics hardware.

System 200 may also be communicatively connected to one or more database(s) 227. System 200 may be communicatively connected to database(s) 227 through network 140. Database 227 may include one or more memory devices that store information and are accessed and/or managed through system 200. By way of example, database(s) 227 may include Oracle™ databases, Sybase™ databases, or other relational databases or non-relational databases, such as Hadoop sequence files, HBase, or Cassandra. The databases or other files may include, for example, data and information related to the financial records, purchase transaction data, etc. Systems and methods of disclosed embodiments, however, are not limited to separate databases. In one aspect, system 200 may include database 227. Alternatively, database 227 may be located remotely from the system 200. Database 227 may include computing components (e.g., database management system, database server, etc.) configured to receive and process requests for data stored in memory devices of database(s) 227 and to provide data from database 227.

In embodiments where FSP 110 is implemented as described above with respect to system 200, database 101 in FSP 110 in FIG. 1 may be implemented as described above with respect to database 227.

Figure 3:
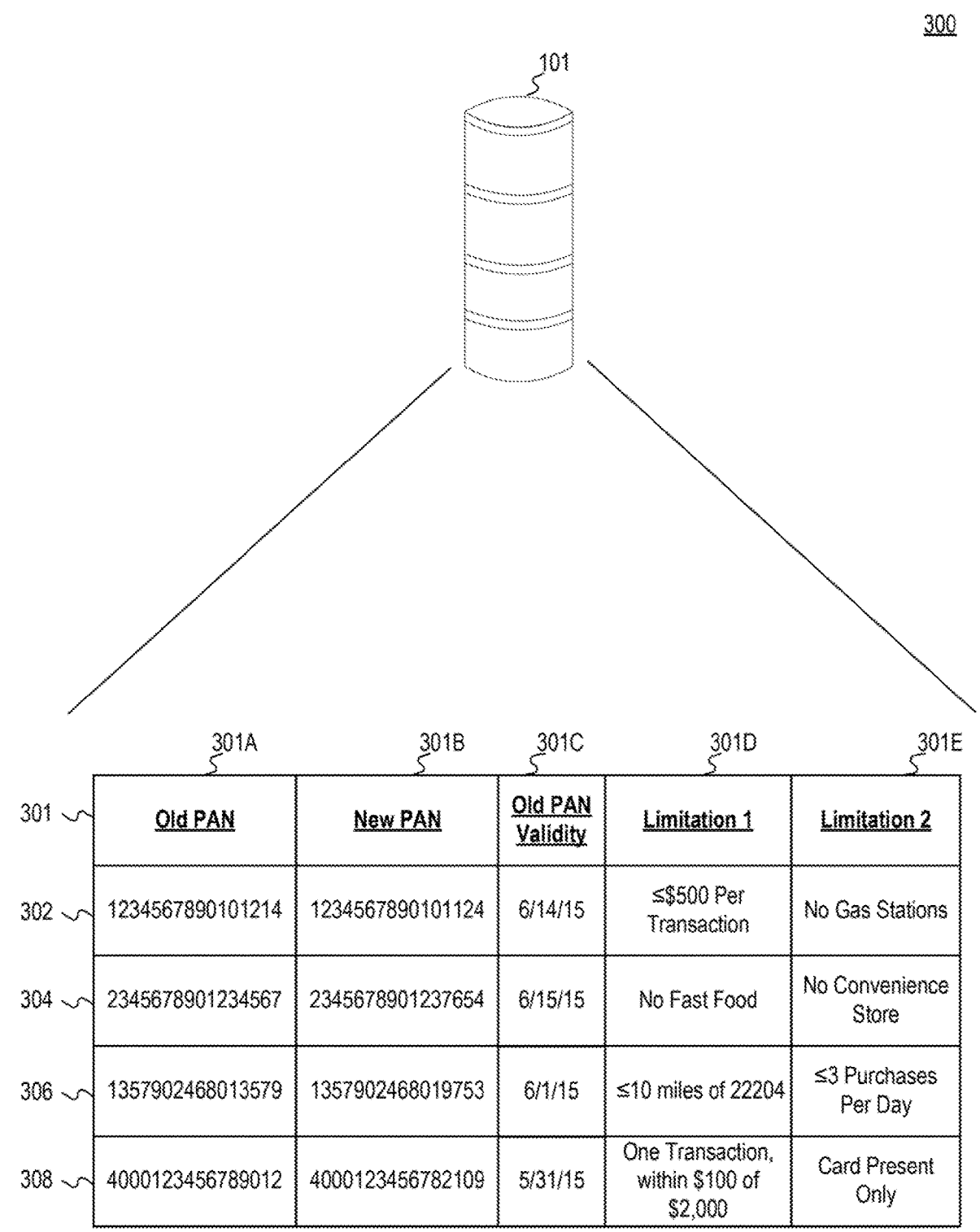
FIG. 3 is a diagram of exemplary data stored in a database, consistent with disclosed embodiments.

FIG. 3 is a diagram 300 of exemplary information stored in a database 101, consistent with disclosed embodiments. In one aspect, database 101 stores one or more tables that contain records 302, 304, 306, and 308. Each of records 302, 304, 306, and 308 contain one or more fields 301A, 301B, 301C, 301D, and 301E. The fields, records, and values therein in FIG. 3 are exemplary and are provided to illustrate embodiments of the disclosure. In some embodiments, other fields may be included in database 101; in other embodiments, the information depicted in FIG. 3 may be stored as part of a larger database. For example, database 101 may be included in a larger database (not shown) that contains one record for each customer of an FSP 110, such that each PAN associated with a customer is contained in a single record of that larger database.

Each record may contain field 301A, entitled "Old PAN." Field 301A contains a PAN (Primary Account Number) associated with a payment card or other payment device that is related to a received fraud communication. For example, if a cardholder associated with card 132 in FIG. 1 lost card 132 in a house fire, while out running errands, etc. the cardholder may report the loss of that card. The PAN associated with that card may be inserted (e.g., by temporary authorization system 114) into database 110 as an entry under field 301A.

Each record may also contain field 301B, entitled "New PAN." Field 301B contains a PAN associated with a new payment card that, in some embodiments, was issued in response to the received fraud communication. For example, if a cardholder associated with card 132 in FIG. 1 lost card 132 in a house fire, while out running errands, etc. the cardholder may report the loss of that card. FSP 110 may generate a new PAN (e.g., as part of generating and sending the cardholder a new card) and insert that new PAN into database 110 as an entry under field 301B.

Each record may also contain field 301C, entitled "Old PAN Validity." Field 301C contains a date or time after which the PAN stored in field 301A (the "Old PAN") will no longer be valid. Embodiments of the present disclosure enable cardholders associated with payment cards to continue using PANs that have been affected by fraudulent transactions for a limited amount of time. The validity period stored in field 301C determines that amount of time.

Each record may also contain fields 301C and 301D, entitled "Limitation 1" and "Limitation 2," respectively. Fields 301C and 301D contain limitations on the use of the PAN stored in field 301A ("Old PAN"). Limitations include, for example, a limitation on the amount of a transaction or set of transactions, a limitation on the location(s) and/or type(s) of merchants at which the old PAN can be used, a limitation on the number of purchases that can be made per day, limits on the dollar value of purchases during a time period, a limitation on the PAN that prevents all transactions except for a single transaction having an approximate amount, a limitation on the PAN that requires all transactions be made using the card itself (e.g., rather than entering a PAN and CVV on a web site), or the like. (Old PAN Validity 301C may also be understood as a "Limitation" on the Old PAN, for example, because it limits the ability to use the Old PAN.) While exemplary FIG. 3 depicts two fields of limitations 301C and 301D in each record, in some embodiments, records may contain an unlimited number of limitations.

One of ordinary skill will understand that database 101 may contain other fields and/or additional types of data. For example, database 101 may contain information such as security codes (e.g., CVV, CVV2) associated with one or both of old PAN 301A and new PAN 301B, may contain expiration dates associated with one or both of old PAN 301A and new PAN 301B, may contain names on payment cards associated with one or both of old PAN 301A and new PAN 301B, or may contain other details such as whether a PAN in field 301A is no longer valid (e.g., because the cardholder has received and/or used the PAN in corresponding field 301B). Moreover, while FIG. 1 depicts database 101 as being part of FSP 110, in other embodiments, database 101 may be implemented as part of one or more of debit system 150 or credit system 160.

Figure 4A:
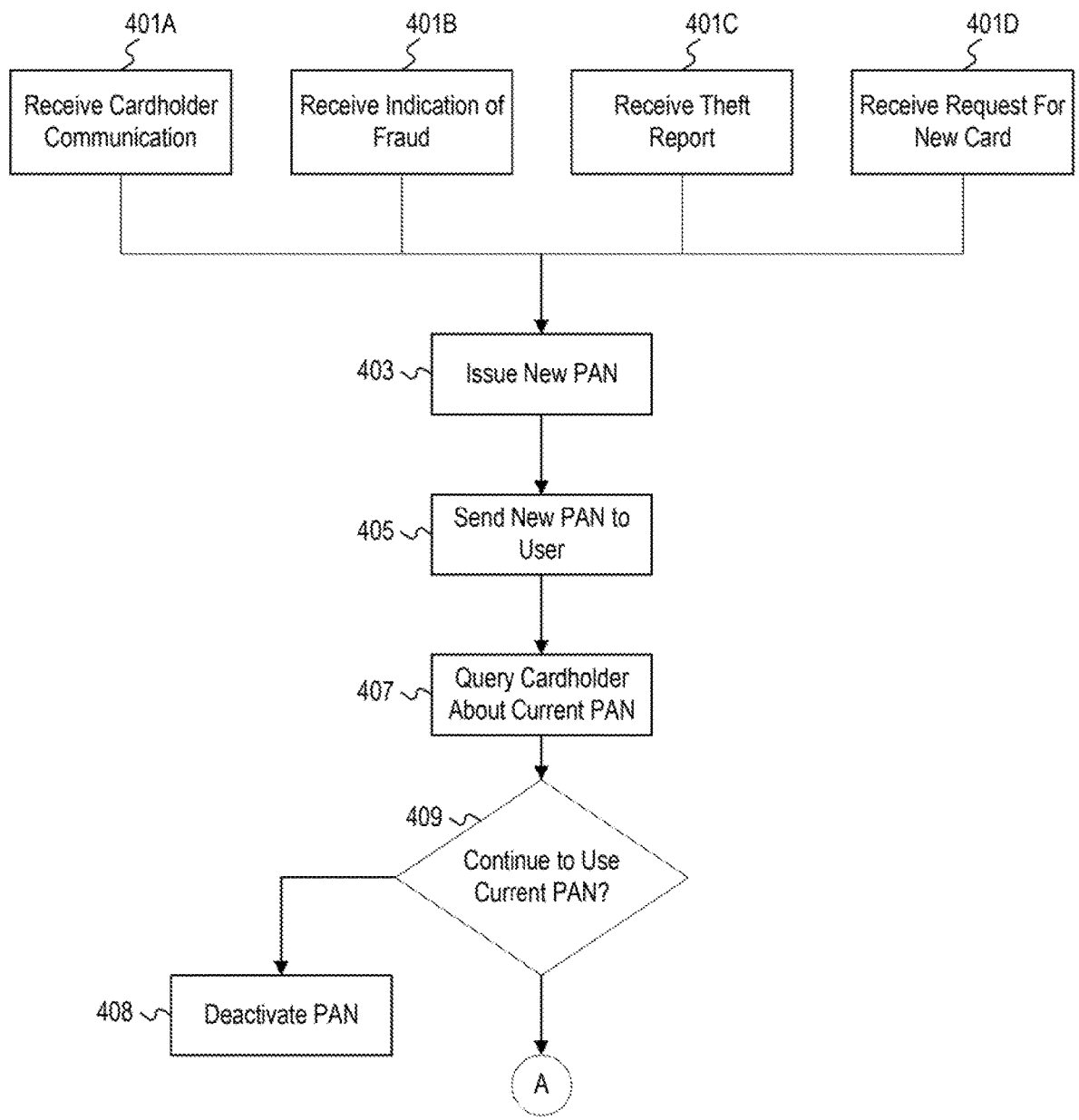
FIG. 4A is a flow chart of an exemplary process for processing a fraud communication, consistent with disclosed embodiments.

FIG. 4A is a flow chart of an exemplary process 400 for processing a fraud communication, consistent with disclosed embodiments.

Process 400 begins at steps 401A, 401B, 401C, and/or 401D. In steps 401A, 401B, 401C, and/or 401D, FSP 110 receives one or more communications related to a PAN. For example, in step 401A, FSP 110 may receive a communication from a cardholder (e.g., from an application on client device 130, via a call center contacted by the cardholder, etc.) indicating that the PAN has or may have been involved in a fraudulent situation. For example, a cardholder may realize that she used a payment card at an Automated Teller Machine ("ATM") only to find out later that a nefarious third-party was "skimming" credit card data (e.g., copying the magnetic stripe or other information from a payment card without permission from the cardholder). The cardholder may utilize mobile device 130 to report potential fraud and request the FSP 100 cancel or suspend the PAN.

As another example, in step 401B, FSP 110 may receive an indication that fraud has occurred or is occurring at a particular merchant or on a particular network. For example, FSP 110 may receive an indication from an administrator that merchant system 122 has been compromised, and information related to card(s) used on a particular day may have been accessed by a nefarious actor.

As another example, in step 401C, FSP 110 may receive a theft report from a cardholder or other entity (such as law enforcement personnel). The theft report, in some embodiments, may indicate that a payment card was stolen from the cardholder and may have been used improperly, copied, or cloned.

As another example, in step 401D, FSP 110 may receive a request from a cardholder for a new card. While such a request may be received in conjunction with a fraud communication (step 401A), a fraud indication (step 401B), or a theft report (step 401C), in some embodiments a cardholder may simply request a new card in order to receive a new PAN without suspecting that the current PAN is at risk of experiencing fraud, such as if the card was lost under known circumstances (e.g., in a house fire).

Whatever the communication, in step 403, FSP 110 may issue a new PAN. Issuing a new PAN comprises, for example, creating a new PAN, expiration date, security code, and/or information necessary to initialize a new card having a chip 132B (e.g., an initialization value for a Dynamic CVV) such that a customer can use the new card. In some embodiments, issuing a new PAN may comprise generating new digits and reusing some digits from a current PAN. For example, some PANs comprise a BIN (Bank Identification Number). The BIN may be the first six digits of the PAN, while the cardholder's account is identified by the remaining 8-10 digits.

In step 405, FSP 110 may send the new PAN to the cardholder. Sending the new PAN may comprise imprinting and/or encoding a new PAN, expiration date, security code, etc. on a card for shipment to a cardholder, shipping a card to a cardholder, sending a communication to client device 130 to replace a current PAN or other information on client device 130, or the like. In some embodiments, the communication sent to client device 130 may comprise instructions for replacing a PAN (such as the PAN reported in steps 401A-401D) with the new PAN issued in step 403. In other embodiments, the communication sent to client device 130 may comprise instructions to remove a current PAN from client device 130 without automatically replacing it with a new PAN.

Figure 6C:
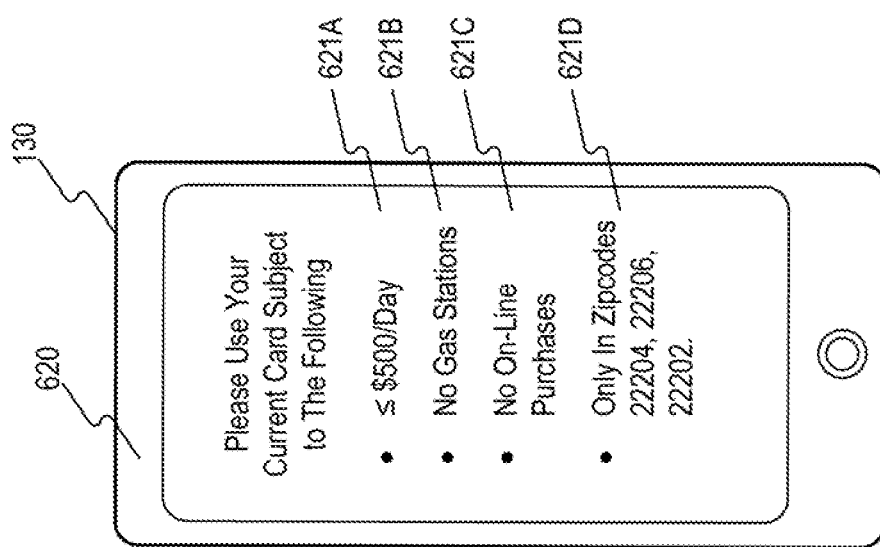
FIG. 6C is a diagram of an exemplary user interface for providing limitations on a fraud-affected PAN, consistent with disclosed embodiments.
Figure 6B:
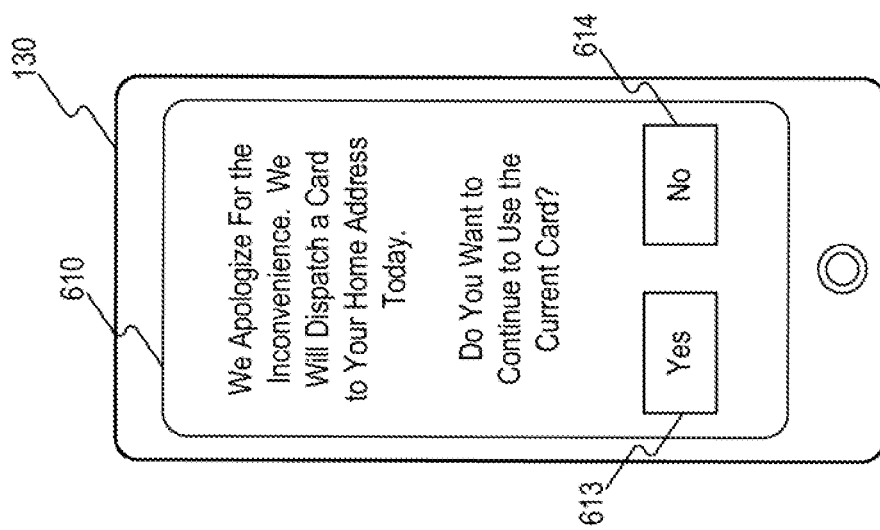
FIG. 6B is a diagram of an exemplary user interface for enabling a user to utilize a fraud-affected PAN, consistent with disclosed embodiments.

In step 407, FSP 110 may initiate a communication to the cardholder requesting the cardholder to confirm whether the current PAN should remain active. For example, FSP 110 may send a message to client device 130 requesting the cardholder to confirm whether or not she wishes to continue using the current PAN with limitations attached. (This is depicted in FIGS. 6B and 6C, described below.) Other examples include contacting the cardholder by telephone (either by initiating contact by a human operator or an automated telephone response system), contacting the cardholder via e-mail or text message, or contacting the cardholder by other means.

In step 409, FSP 110 determines whether or not the cardholder wishes to continue using the current PAN. For example, if the cardholder indicates no desire in using the current PAN (e.g., if the cardholder expresses no desire to use the associated account until receiving a new card 132), FSP 110 may continue to step 408 where FSP 110 initiates procedures to deactivate the current PAN. Deactivating the current PAN comprises, for example, sending a message to debit system 150, credit system 160, or database 101, indicating that the PAN is no longer valid and should not be associated with an account. If, on the other hand, FSP 110 determines that the current PAN should continue to be used temporarily, process 400 continues to step 411 in FIG. 4B.

Figure 4B:
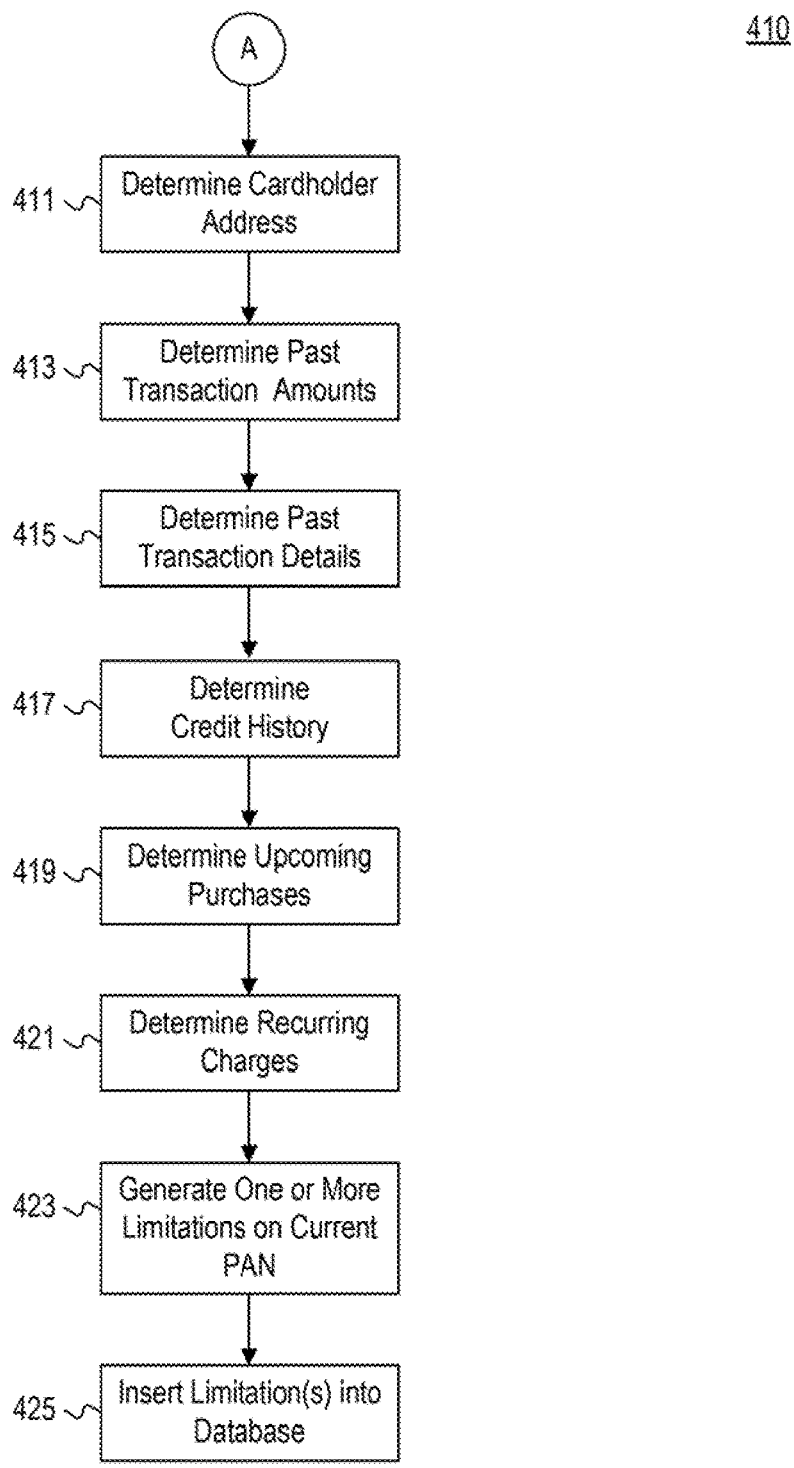
FIG. 4B is a flow chart of an exemplary process for generating limitations associated with a PAN, consistent with disclosed embodiments.

FIG. 4B is a flow chart of an exemplary process 410 for generating limitations associated with a PAN, consistent with disclosed embodiments. In some embodiments, FSP 110 may determine details about transactions that occurred in the past by querying database 101, debit system 150, credit system 160, or another system. FSP 110 (or other systems) may employ these details to identify spending patterns and other information for generating limitations for a PAN based on a determination of what a "typical" transaction is, and allow transactions that appear to be "typical." In some embodiments, this process involves determining details about transactions that were fraudulent in order to determine the types of limitations that may be placed on a PAN.

In step 411, FSP 110 determines an address associated with a cardholder. In some embodiments, step 411 comprises determining more than one address associated with a cardholder. For example, step 411 may comprise determining one or more of an address of the cardholder's home, an address of the cardholder's office, an address of an office associated with the cardholder's spouse or partner, an address of a school associated with the cardholder's child/children, or the like.

In step 413, FSP 110 determines past transaction amounts. Step 413 may include, for example, determining an average transaction amount associated with past transactions, a standard deviation associated with past transactions, the timing between transactions (e.g., determining that no two purchases happen within 30 minutes of one another), or the like.

In step 415, FSP 110 determines details associated with transactions that the cardholder has made in the past (e.g., before fraud was reported on the card). In one aspect, FSP 110 may determine a general location for past transactions. As one example, FSP 110 may determine where all past transactions in a particular metropolitan area took place. FSP 110 may then determine a radius that, if drawn on a map, would generate a circle that surrounds 90% of those transactions. FSP 110 may store that radius value in association with one or more of the addresses determined in step 411 (e.g., in database 101).

In step 417, FSP 110 determines a credit history associated with the cardholder. For example, the credit history may be based on the cardholder's past payment history, a credit limit associated with the account, or the like.

In step 419, FSP 110 determines whether there are any upcoming purchases. For example, after reporting fraud on a card, the cardholder may contact a representative of FSP 110 to indicate that the cardholder still wishes to use the PAN to make one or more particular purchase(s). This could be, for example, a single large purchase (such as a TV or computer) or a series of smaller purchases (such as convenience store or restaurant purchases). FSP 110 determines whether the cardholder has indicated a need to use the card to make a purchase before the new card and/or PAN is usable by the cardholder.

In step 421, FSP 110 may determine whether there are recurring charges for the card. For example, when a cardholder initiates a recurring payment at merchant 120, merchant system 122 may generate a transaction request that includes data indicating that a similar transaction may be performed on a periodic basis (e.g., monthly). Such data may include, for example, information stored in fields of an ISO 8583 message (e.g., data fields 62 and/or 63) that indicates that a transaction is likely to recur next week, next month, or next year. Thus, in step 421, FSP 110 may determine that the transaction is likely to recur, and may be less likely to decline the transaction as fraudulent.

In step 423, FSP 110 generates one or more limitations on the current PAN. For example, FSP 110 may utilize the determinations in steps 411-423 to determine what sorts of transactions the cardholder is likely to initiate using the current PAN. As another example, FSP 110 may determine or obtain a value related to the PAN, such as a risk score. FSP 110 may determine a value based on information provided by devices that are part of FSP 110 (e.g., FSP system 112, temporary authorization system 114, payment service system 116, database 101), or from other systems (such as debit system 150, credit system 160, or merchant system 122). FSP 110 may generate limitations based on the risk score as well. In step 425, FSP 110 may also generate and send the generated limitations to database 101, debit system 150, or credit system 160.

Figure 5:
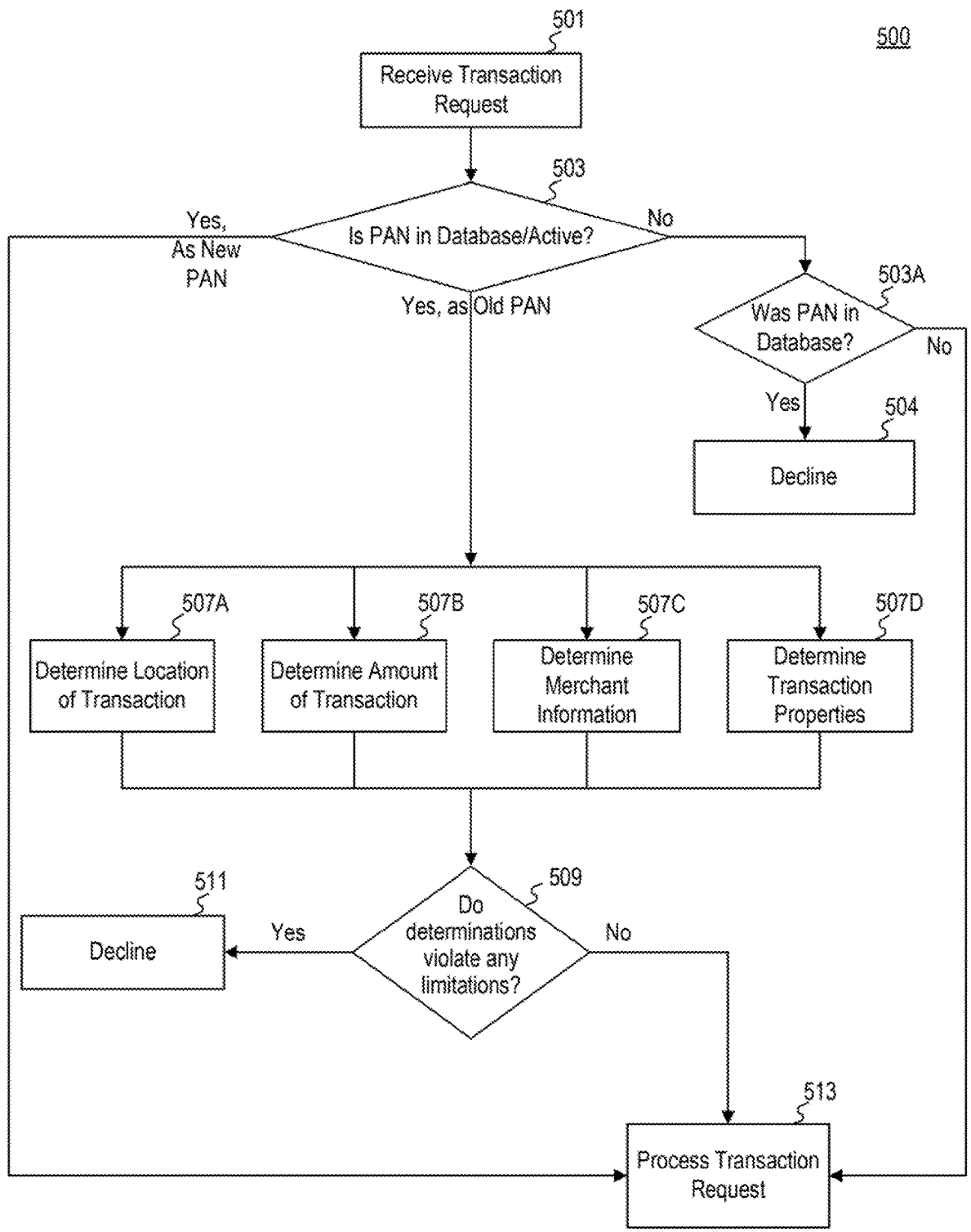
FIG. 5 is a flow chart of an exemplary process for processing transactions including a PAN, consistent with disclosed embodiments.

FIG. 5 is a flow chart of an exemplary process 500 for processing transactions including a PAN, consistent with disclosed embodiments.

Process 500 starts at step 501. In step 501, FSP 110 receives a transaction request from merchant system 122, debit system 150, or credit system 160. The transaction request could take many forms, such as ISO 8583. The transaction request may include information such as a PAN; an amount (e.g., a price); the name, address, or other information about a merchant; information about the transaction (e.g., whether recurring or one-time, the type of good or service purchased), or the like.

The transaction request could relate to a debit transaction (e.g., from debit system 150), such as an ACH (Automated Clearing House) transaction. The transaction request could also relate to a credit/charge transaction (e.g., from credit system 160) such as an EFT (Electronic Funds Transfer) transaction. Other types of transactions are possible as well. FSP 110 is not limited to receiving only these types of transactions.

In step 503, FSP 110 may determine whether a PAN in the transaction request is included in a database, such as database 101. This may be performed using standard lookup procedures, and one of skill will recognize that certain systems can be used to efficiently search databases for particular information. The result of step 503 may be determining either that the PAN is in database 101 in the "New PAN" field of one or more records, in the "Old PAN" field of one or more records, or not in database 101.

If, in step 503, FSP 110 determines that a PAN included in the received transaction request is not in database 101, process 500 may continue to step 503A, where FSP 110 can determine whether the received PAN was previously in the database. For example, FSP 110 may determine that the PAN was previously in database 101, e.g., by checking a cache memory, but is no longer in database 101. (Alternatively, FSP 110 may determine that the PAN is not in database 101 if the PAN is stored in database 101 with an indication that the PAN is no longer active.)

In either case, if it is determined that the PAN was previously active and/or in database 101, process 500 continues to step 504, where the transaction is declined. Declining a transaction may comprise, for example, sending a declination message to payment service system 116, debit system 150, credit system 160, client device 130, merchant system 122, or another device or system. If FSP 110 determines that the received PAN was not in the database, the received PAN may in fact be a valid PAN that is not affected by any fraud. In that situation, process 500 may continue to step 513, where FSP 110 may process the transaction request. Processing the transaction request may comprise, for example, sending a message to payment service system 116, debit system 150, credit system 160, client device 130, merchant system 122, or another device or system, indicating that the transaction should be approved.

In some embodiments, the elements in steps 503A, 504, and 513 may be performed before step 503.

If, in step 503, FSP 110 instead determines that the received PAN is in database 101 in the "New PAN" field of one or more records, the received PAN may in fact be a newly-generated PAN (as explained above with respect to step 403 in FIG. 4A). In this situation, in some embodiments, process 500 may continue to step 513 to process the transaction request. Processing the transaction request may comprise, for example, sending a message to payment service system 116, debit system 150, credit system 160, client device 130, merchant system 122, or another device or system, indicating that the transaction should be approved.

If, in step 503, FSP 110 instead determines that the received PAN is in database 101 in the "Old PAN" field of one or more records, the received PAN may in fact be the PAN that was reported to have fraudulent activity associated with it (e.g., as explained above with respect to steps 401A-401D in FIG. 4A). In this situation, process 500 may continue to steps 507A-507D. Steps 507A-507D—which may be performed in parallel, in series, or in various other combinations—relate, in some embodiments, to determining information related to the transaction. For example, in step 507A, FSP 110 may determine a location associated with the transaction, such as an address of a terminal at which a cardholder presented card 132 or mobile device 130, a website at which a cardholder is attempting to make a purchase using the PAN, a country in which merchant 120 is incorporated, or other information. As another example, in step 507B, FSP 110 may determine information related to an amount of the transaction, such as the final dollar amount associated with the transaction, the amount of one or more items in the transaction, or the like. As another example, in step 507C, FSP 110 may determine information about the merchant that initiated the transaction request, such as the name of merchant 120, the field of work that merchant 120 is in (e.g., categories such as "home improvement," "restaurant," or "gas station," or broad categories such as "goods" or "services"), or the average value of transactions performed at merchant 120. As another example, in step 507D, FSP 110 may determine properties of the transaction request itself, such as whether the transaction request is a recurring transaction request, whether the transaction is "card-present" (e.g., whether the card is swiped through a terminal or the PAN is entered manually) or not, or the like. The information determined in steps 507A-507D may be determined by performing, for example, a lookup in a database (e.g., database 101), a query to one or more other systems (e.g., debit system 150 or credit system 160), or the like. Moreover, other determinations may be performed in addition and/or in the alternative to the above. The disclosed embodiments are not limited to these four classes of determinations. For example, FSP 110 may determine the time between the current transaction request and the most recent previous transaction, the number of transactions performed using the PAN in a period of time (e.g., 24 hours)

After performing one or more of steps 507A-507D, process 500 may proceed to step 509. In step 509, FSP 110 determines whether or not any of the determinations made in step 507A-507D violate any of the limitations stored in database 101. For example, as explained in steps 411-425 of FIG. 4B, FSP 110 may insert one or more limitations for a PAN into database 101. Step 509 comprises FSP 110 determining whether any one of the limitation(s) is violated by a transaction request. For example, if a PAN is associated with the limitation that the PAN not be used outside of 10 miles of Zip Code 22204, and for no more than three purchases per day, FSP 110 may determine that the transaction should not proceed if the PAN is used 12 miles away from Zip Code 22204, or is being used for the fourth time on a particular day. If FSP 110 determines that at least one property of the transaction violates or would cause a violation of one or more restrictions in database 101, process 500 may continue to step 511 and decline the transaction request. Otherwise, process 500 may continue to step 513 to process the transaction request (e.g., to approve it).

Figure 6A:
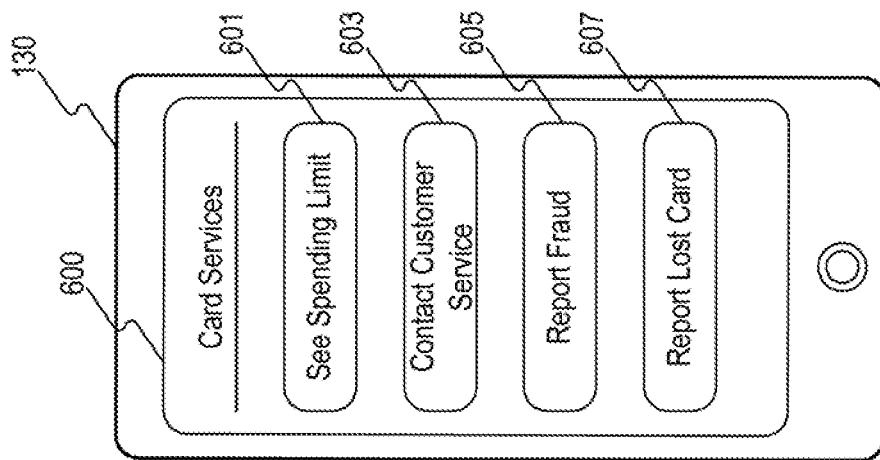
FIG. 6A is a diagram of an exemplary user interface for reporting a fraud event, consistent with disclosed embodiments.

FIG. 6A is a diagram of an exemplary user interface 600 for reporting a fraud event, consistent with disclosed embodiments. User interface 600 is illustrated as being displayed on a mobile device, but user interface 600 can be adapted for and displayed on any type of client device 130. User interface 600 comprises one or more interaction items, such as buttons, links, or hotspots, 601, 603, 605, and 607. A user actuates client device 130 (e.g., using a keyboard, a mouse, a touch screen, or the like) in order to select one or more of interaction items 601-607. If a user of mobile device 130 actuates item 601, client device 130 may display a spending limit associated with a PAN associated with client device 130. For example, the PAN may be associated with client device 130 in that the client device contains the PAN and may utilize it in a transaction request. If a user of mobile device 130 actuates item 603, mobile device 130 may initiate contact with a customer service representative (e.g., by dialing a phone number, initiating an email communication, sending an SMS/MMS, accessing a website, or the like) on behalf of the user.

If a user actuates items 605 or 607, client device 130 may generate and send a communication from FSP 110 and/or temporary authorization system 114 indicating that a current PAN associated with an account may have experienced fraud or may been to be replaced with a new PAN. Client device 130 may then display user interface 610.

FIG. 6B is a diagram of an exemplary user interface 610 for enabling a user to utilize a fraud-affected PAN, consistent with disclosed embodiments. User interface 610 includes a message indicating that a new card will be sent to the cardholder's address, and requests that the cardholder indicate whether or not the account will be used before receiving a new card. If the user actuates item 613 ("Yes"), steps such as those described in FIG. 4B (described above) may be executed in order to enable limited use of the card. As another example, client device 130 may present a user interface (not shown) that requests the cardholder input one or more purchases to be made in the near future with the card (by, e.g., providing the location, merchant, approximate amount, and/or other transaction details regarding an anticipated purchase). Once the steps in FIG. 4B are executed, client device 130 may present a user interface containing limitations, such as user interface 620.

FIG. 6C is a diagram of an exemplary user interface 620 for providing limitations on a fraud-affected PAN, consistent with disclosed embodiments. User interface 620 presents one or more limitations 621A-621D on the current PAN, indicating to the cardholder how the account may and may not be used before the cardholder receives the new card. In some embodiments, limitations 621A-621D may comprise limitations identified by FSP 110 based on the user's purchase history. In some embodiments, the user may operate client device 130 identify choose or otherwise identify limitations 621A-621D.

Figure 7:
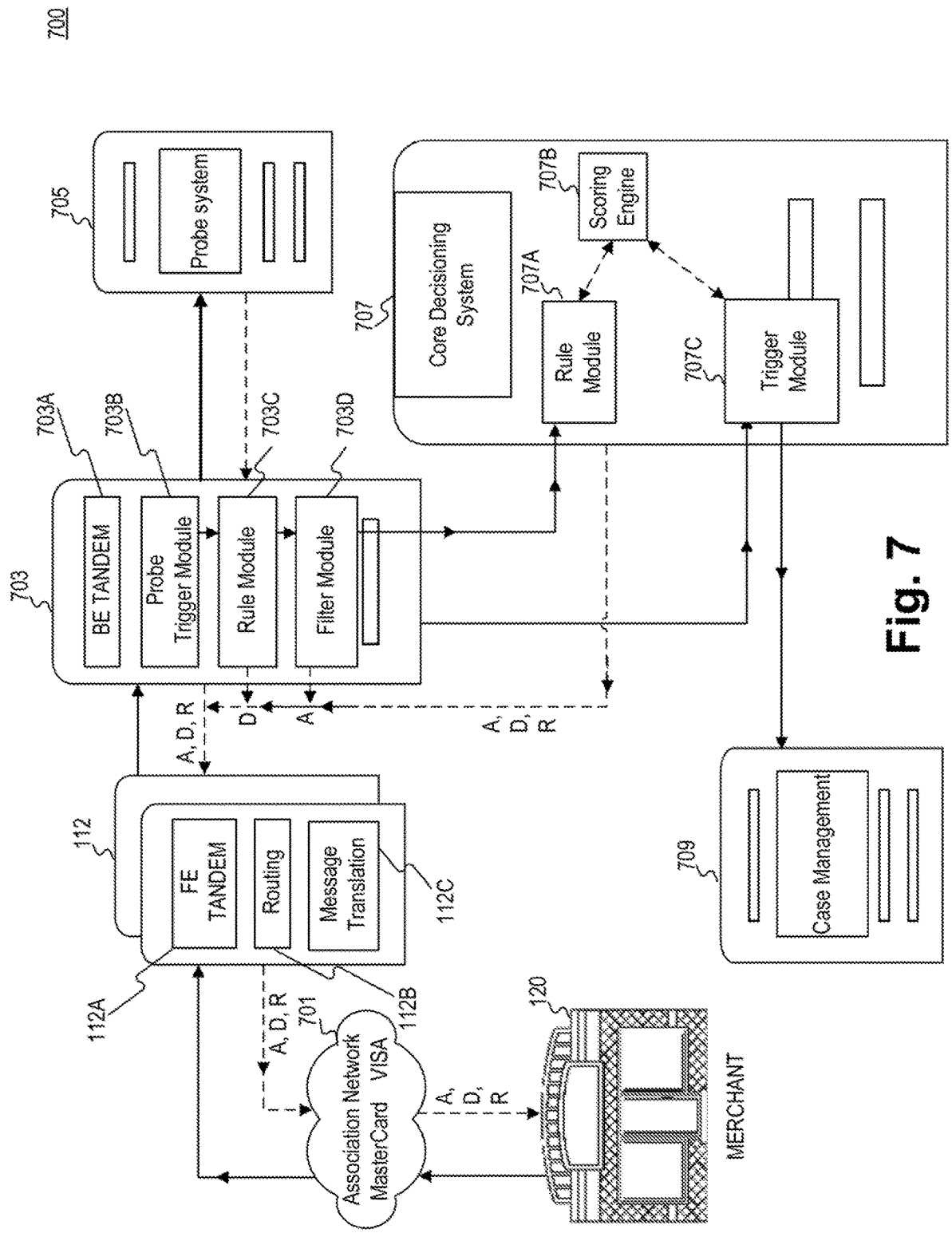
FIG. 7 is a block diagram of an exemplary system, consistent with disclosed embodiments.

FIG. 7 is a block diagram of an exemplary system 700, consistent with disclosed embodiments. System 700 depicts example systems that illustrate the various systems usable to implement the systems, methods, and other embodiments depicted in the remainder of the disclosure. System 700 includes merchant 120, association network 701, FSP system 112, fraud system 703, probe system 705, core decisioning system 707, and case management system 709. Each of systems 703, 705, 707, and 709 may, in some embodiments, be implemented as part of FSP 110 (in FIG. 1); however, in other embodiments, these systems may be implemented as separate devices operated or owned by separate entities.

Merchant 120 may initiate a transaction request through association network 701 in response to receiving a card (e.g., card 132) from a customer. Merchant 120 may, in some embodiments, conduct a fraud evaluation on each transaction request initiated by a customer before sending such a request. Association network 701 may be, for example, one of debit system 150 or credit system 160. Association network 701 may forward the transaction request to FSP system 112.

FSP system 112, in some embodiments, may include tandem module 112A, routing module 112B, and message translation module 112C. Routing module 112B may, in some embodiments, be operable to determine where transaction requests and responses to transaction requests should be sent (e.g., to a particular association network and/or fraud system). Message translation module 112C may, in some embodiments, be operable to translate an incoming transaction request, for example, in a standard ISO format (e.g., ISO8583), to a format usable by other systems such as 110A, 110B, 110C, and 110D.

FSP system 112 may forward a transaction request (in some embodiments, after message translation module 112C has converted the request) to fraud system 703. Fraud system 703 may include BE Tandem module 703A, probe trigger module 703B, rule module 703C, and filter module 703D. Probe trigger module 703B may, in some embodiments, be operable to determine whether the transaction request triggers further review. For example, probe trigger module 703B may be operable to determine whether the transaction request is suspicious such that further authentication should be requested from the customer before proceeding.

Rule module 703C, in some embodiments, may be operable to analyze the transaction request against a set of fraud rules common to multiple accounts. For example, rule module 703C may be operable to decline transactions that are drastically atypical compared to other transactions on a particular PAN (e.g., based on the amount of transactions, the time of transactions, or the location of merchants associated with transactions). Rule module 703C may, in some embodiments, generate and send messages declining transaction requests to FSP system 112.

Filter module 703D, in some embodiments, may be operable to filter transaction requests that have passed through rule module 703C and probe trigger module 703B in order to determine whether further analysis is required. Filter module 703D may, in some embodiments, examine transaction requests against filters for known types of transactions, and may generate and send messages approving transaction requests determined as not likely to be fraudulent to FSP system 112. In some embodiments, filter module 703D may also be operable to generate and send messages declining transaction requests determined as likely to be fraudulent. Filter module 703D may also send transaction requests that are not filtered (e.g., not approved, but not necessarily declined) to core decisioning system 707.

In some embodiments, the functionality and structure of temporary authorization system 114 (described above with respect to FIG. 1) may be implemented in part or in full in fraud system 703. In one embodiment, the functionality related to temporary authorization system 114 could analyze a transaction request after probe trigger module 703B has analyzed the request. In another embodiment, the functionality related to temporary authorization system 114 could analyze a transaction request after rule module 703C has analyzed the request. For example, after rule module 703C analyzes the transaction request, the functionality related to temporary authorization system 114 could analyze the request in order to confirm or reverse the determination (e.g., to approve or decline the request). In still another embodiment, the functionality related to temporary authorization system 114 could analyze a transaction request after filter module 703D has analyzed the request. For example, after filter module 703D analyzes the transaction request, the functionality related to temporary authorization system 114 could analyze the request in order to confirm or reverse the determination (e.g., to approve or decline the request). Other embodiments are possible as well (e.g., a module analyzing the transaction request in parallel with one or more other modules).

Fraud system 703 may, after analysis, send the transaction request to probe system 705. Fraud system 703 may also send transaction requests to core decisioning system 707. Core decisioning system 707 in some embodiments, may be configured to determine whether transaction requests that have passed through fraud system 703 should be approved. Core decisioning system 707 may include rule module 707A, scoring engine 707B, and trigger module 707C.

Rule module 707A, in some embodiments, may be configured to apply rules to transaction requests received from filter module 703C. In some embodiments, such transaction requests may be "risky" in that there is a possibility that they are fraudulent. In these embodiments, rule module 707A may receive these transaction requests and process them to determine whether or not they should be approved. Such a determination may also involve scoring engine 707B. Scoring engine 707B, in some embodiments, may be configured to determine the likelihood of fraud, the profitability related to a particular transaction, or RTEBM.

Rule module 707A may also be configured to send messages related to a transaction request (e.g., one of an approval, decline, or request for further information) to FSP system 112. Trigger module 707C may be configured to communicate with case management system 709.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system, comprising:
one or more processors; and
a non-transitory computer-readable storage medium storing instructions, which, when executed by the one or more processors, cause the one or more processors to perform operations comprising:
generating, based on past transaction details related to an account number, one or more limitations for the account number;
assigning the one or more limitations and a time period to the account number, wherein the time period indicates a time after which the account number cannot be used;
receiving a transaction request from a merchant system;
determining, based on the transaction request, that both the time period has not expired and that the one or more limitations have not been violated; and
in response to determining, based on the transaction request, that both the time period has not expired and that the one or more limitations have not been violated, sending a transaction approval message to the merchant system.

2. The system of claim 1, wherein the instructions cause the one or more processors to perform operations comprising:
receiving data related to the account number; and
in response to receiving the data related to the account number, retrieving the past transaction details, the past transaction details corresponding to the account number.

3. The system of claim 2, wherein the instructions for receiving the data related to the account number cause the one or more processors to receive a message indicating fraudulent account activity or receiving a lost card communication.

4. The system of claim 2, wherein the data related to the account number comprises an input from a user or a message from a server received using a mobile device.

5. The system of claim 1, wherein the instructions further cause the one or more processors to transmit, using a communication system, a communication comprising a command that causes a recipient device to generate for display the one or more limitations in association with the account number, wherein the command comprises the time period and the one or more limitations.

6. The system of claim 1, wherein the instructions further cause the one or more processors to generate for display options to modify the one or more limitations associated with the account number.

7. The system of claim 1, wherein the instructions further cause the one or more processors to perform operations comprising:
determining locations where past transactions associated with the account number occurred;
defining a geographic boundary centered that includes at least a portion of the locations where the past transactions associated with the account number occurred; and
restricting future transactions to an area within the geographic boundary by designating the geographic boundary as one of the one or more limitations.

8. A method comprising:
generating, by a processor, based on past transaction details related to an account number, one or more limitations for the account number;
assigning, by the processor, the one or more limitations and a time period to the account number, wherein the time period indicates a time after which the account number cannot be used;
receiving, by the processor, a transaction request from a merchant system;
determining, by the processor, based on the transaction request, that both the time period has not expired and that the one or more limitations have not been violated; and
in response to determining, by the processor, based on the transaction request, that both the time period has not expired and that the one or more limitations have not been violated, sending, by the processor, a transaction approval message to the merchant system.

9. The method of claim 8, further comprising:
receiving data related to the account number; and
in response to receiving the data related to the account number, retrieving the past transaction details, the past transaction details corresponding to the account number.

10. The method of claim 9, wherein receiving the data related to the account number comprises receiving a message indicating fraudulent account activity or receiving a lost card communication.

11. The method of claim 9, wherein the data related to the account number comprises an input from a user or a message from a server received using a mobile device.

12. The method of claim 8, further comprising transmitting, using a communication system, a communication comprising a command that causes a recipient device to generate for display the one or more limitations in association with the account number, wherein the command comprises the time period and the one or more limitations.

13. The method of claim 8, further comprising generating for display options to modify the one or more limitations associated with the account number.

14. The method of claim 8, further comprising:
determining locations where past transactions associated with the account number occurred:
defining a geographic boundary centered that includes at least a portion of the locations where the past transactions associated with the account number occurred; and
restricting future transactions to an area within the geographic boundary by designating the geographic boundary as one of the one or more limitations.

15. A non-transitory, computer-readable medium storing instructions that, when executed by one or more processors, cause the one or more processors to perform operations comprising:
- generating, based on past transaction details related to an account number, one or more limitations for the account number;
- assigning the one or more limitations and a time period to the account number, wherein the time period indicates a time after which the account number cannot be used;
- receiving a transaction request from a merchant system;
- determining, based on the transaction request, that both the time period has not expired and that the one or more limitations have not been violated; and
- in response to determining, based on the transaction request, that both the time period has not expired and that the one or more limitations have not been violated, sending a transaction approval message to the merchant system.

16. The non-transitory, computer-readable medium of claim 15, wherein the instructions further cause the one or more processors to perform operations comprising:
- receiving data related to the account number; and
- in response to receiving the data related to the account number, retrieving the past transaction details, the past transaction details corresponding to the account number.

17. The non-transitory, computer-readable medium of claim 16, wherein the instructions for receiving the data related to the account number further cause the one or more processors to receive a message indicating fraudulent account activity or receiving a lost card communication.

18. The non-transitory, computer-readable medium of claim 16, wherein the data related to the account number comprises an input from a user or a message from a server received using a mobile device.

19. The non-transitory, computer-readable medium of claim 15, wherein the instructions further cause the one or more processors to transmit, using a communication system, a communication comprising a command that causes a recipient device to generate for display the one or more limitations in association with the account number, wherein the command comprises the time period and the one or more limitations.

20. The non-transitory, computer-readable medium of claim 15, wherein the instructions further cause the one or more processors to generate for display options to modify the one or more limitations associated with the account number.

* * * * *